United States Patent [19]

Fatt

[11] E Re. 29,703

[45] Reissued Jul. 18, 1978

[54] NON-INVASIVELY MEASURING ARTERIAL OXYGEN TENSION

[75] Inventor: Irving Fatt, Berkeley, Calif.

[73] Assignee: The Regents of The University of California, Berkeley, Calif.

[21] Appl. No.: 668,867

[22] Filed: Mar. 22, 1976

Related U.S. Patent Documents

Reissue of:

[64] Patent No.: 3,893,444
Issued: Jul. 8, 1975
Appl. No.: 434,191
Filed: Jan. 17, 1974

U.S. Applications:

[63] Continuation-in-part of Ser. No. 273,422, Jul. 20, 1972, abandoned.

[51] Int. Cl.[2] ..... A61B 5/00

[52] U.S. Cl. ..... 128/2 E; 128/2 L; 128/2 T; 204/195 B

[58] Field of Search ..... 128/2 L, 2 E, 2.1 E; 204/195 B

[56] References Cited

PUBLICATIONS

Walton, D. M. et al., *8th ISA-Biomed. Sciences Instr. Symposium,* May 1970, pp. 155–158.

Krause, A. C. et al., *Amer. Journ. of Opthalmology,* vol. 42, 1956, pp. 764–769.

Ingvar, D. H. et al., *Acta Physiol. Scand.,* 1960, 48, pp. 373–374.

Kwan, M. et al., *Anesthesiology,* vol. 35, No. 3, Sep. 1971, pp. 309–314.

*Primary Examiner*—Kyle L. Howell

*Attorney, Agent, or Firm*—Owen, Wickersham & Erickson

[57] ABSTRACT

Oxygen tension is measured in the palpebral conjuctiva and is converted to arterial oxygen tension by applying a conversion factor thereto. A polarographic oxygen sensor on the outer surface of a scleral contact member is employed, and the current passed is read and converted, or read in terms of a special calibration.

14 Claims, 7 Drawing Figures

NON-INVASIVELY MEASURING ARTERIAL OXYGEN TENSION

Matter enclosed in heavy brackets [ ] appears in the original patent but forms no part of this reissue specification; matter printed in italics indicates the additions made by reissue.

The invention described herein was made in the course of a grant from the Department of Health, Education and Welfare.

CROSS-REFERENCE TO RELATED APPLICATION

This application is a continuation-in-part of application Ser. No. 273,422 filed July 20, 1972, now abandoned.

BACKGROUND OF THE INVENTION

This invention relates to non-invasive and continuous measurement of arterial oxygen tension.

Arterial oxygen tension or partial pressure and its changes are phenomena with great significance in several fields of medicine, including anesthesiology, treatment of respiratory diseases, and treatment of prematurely born infants. It is very valuable to know exactly what this tension is and to know it continuously and currently. Invasive techniques, such as the analysis of blood samples may overly weaken the patient and in any event cannot give either current or continuous knowledge. The best and quickest analysis of a blood sample consumes several minutes, especially where the laboratory and the patient are a few minutes apart; it can never provide continuous monitoring.

Attempts to predict or determine arterial oxygen tension indirectly from measured tissue oxygen tension have not heretofore yielded any clinically useful methods. When polarographic oxygen sensors are pressed against tissues, such as the skin, the mucous membranes of the mouth, the cornea, or the bulbar conjunctiva, there is no finite steady-state oxygen tension; instead, the recorded oxygen tension falls rapidly to zero. Even after several years of research and development the non-invasive oximeter, which measures oxyhemoglobin saturation rather than oxygen tension, is still not widely used as a monitoring device. In particular, it does not help monitor hyperoxic states.

The present invention is capable of continuously monitoring arterial oxygen tension. It can measure arterial oxygen tension in both hyperoxic and hypoxic states and is not limited by the 100% saturation of hemoglobin as is the oximeter.

The invention enables an anesthetist to observe the instant effect of decreasing and increasing inspired oxygen tension and ventilation.

When ventilation is assisted in chronic and acute respiratory disease, there is need for evaluating the state of respiration; in addition to data such as tidal volume, blood oxygen tension provided by the present invention can be helpful.

A third immediate area of great usefulness of the present invention is in the premature nursery. For example, isolette oxygen tensions can be adjusted by feedback from a device embodying the invention, chronic palpebral conjunctival electrode taped under one eyelid. Either continuous or sporadic non-invasive, non-blood loss evaluation of arterial $PO_2$ can be made.

In the area of chronic lung disease a chest internist can use the invention as a diagnostic tool when correlated with certain simple spirometer measurements. In many instances, the non-invasive nature of the test of the present invention is more acceptable on an outpatient basis than arterial puncture.

In the diagnosis and evaluation of shock this invention is capable of greater sensitivity than a sphygmomanometer. The organism tries to maintain its blood pressure and arterial oxygen tension; however, tissue perfusion and oxygenation, especially to non-critical areas, may be affected very easily.

SUMMARY OF THE INVENTION

This invention rests on my discovery that arterial oxygen tension can be determined by determining the oxygen tension of the palpebral conjunctiva. These two tensions are not the same, nor can a time factor be completely disregarded, but they are so closely related that, for example, by multiplying the palpebral conjunctival oxygen tension by a constant that depends on the type of organism and then subtracting a second constant, the arterial oxygen tension is obtained. Only a short delay time is involved, for the palpebral conjunctival oxygen tension adjusts quickly to any change in arterial oxygen tension.

This discovery has been described in a published paper by Marcus Kwan and Irving Fatt entitled "A Noninvasive Method of Continuous Arterial Oxygen Tension Estimation from Measured Palpebral Conjunctival Oxygen Tension", printed in Vol. 35, No. 3, of Anesthesiology, September 1971, pages 309–314.

The palpebral conjunctiva is a very specialized tissue. The avascular cornea of the open eye obtains almost all of its oxygen from the atmosphere. When the eye is closed, about a third of the oxygen needed by the cornea comes from the aqueous humor, and about two-thirds from the conjunctival capillaries. The vessels of the palpebral conjunctiva are so close to the conjunctival epithelium that they are clearly visible. The mucous membrane epithelium overlying these vessels is only two to four cell layers thick, and appears to have a very low oxygen consumption rate. The palpebral conjunctiva, therefore, is an easily accessible capillary bed not covered by a thick layer of oxygen-consuming tissue.

A suitable polarographic oxygen sensor, such as an electrode assembly, is mounted on a scleral contact lens or lens segment and used to measure palpebral conjunctival tissue gas tensions either continuously or sporadically, as desired. The palpebral conjunctiva supplies oxygen, for example, to the cornea when the eyelids are shut, thus providing a unique opportunity to separate, atraumatically, a capillary bed with a high oxygen tension from its oxygen-consuming tissue.

DESCRIPTION OF A PREFERRED EMBODIMENT

Figure 1:
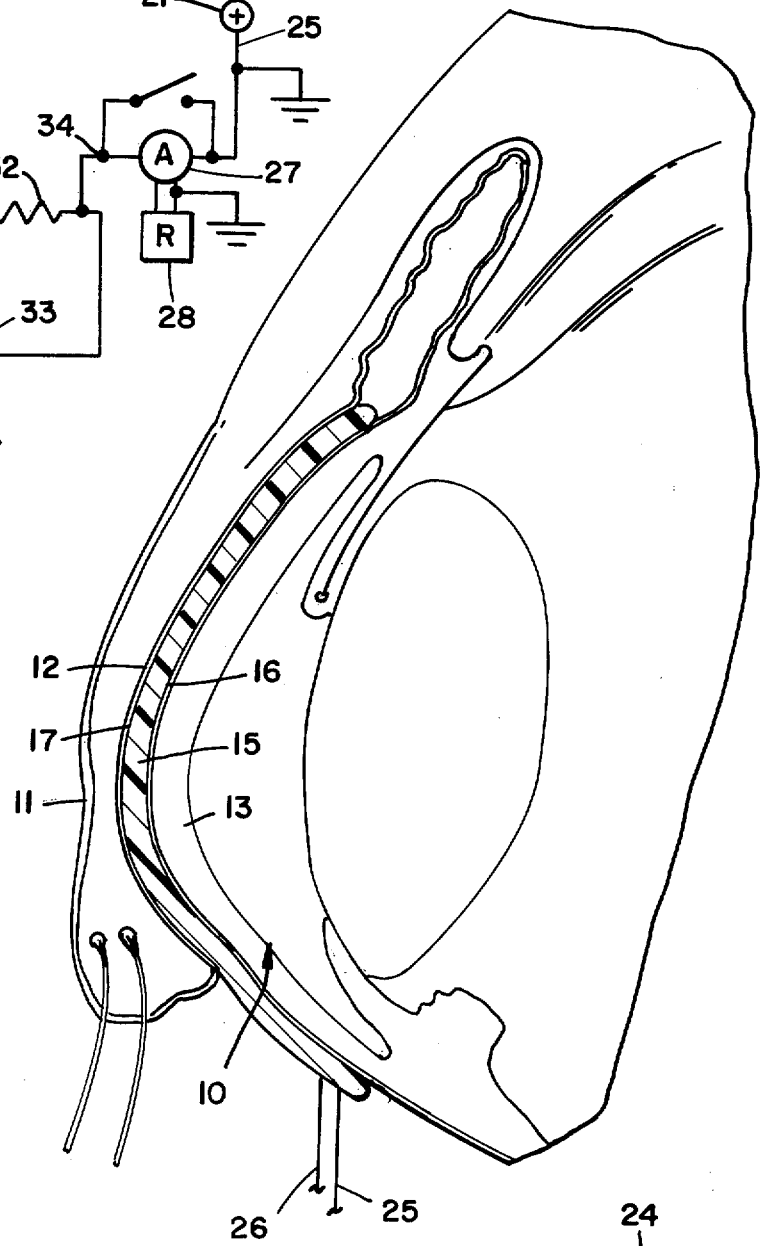
FIG. 1 is a view in cross-section of a portion of an eye and upper eyelid with an electrode-carrying scleral contact lens installed, according to the principles of the invention.

FIG. 1 shows an eye 10 having an eyelid 11 with a palpebral conjunctiva 12. The eye 10 has a cornea 13. According to the present invention, the oxygen tension of the palpebral conjunctiva is to be sensed and measured. This is done by inserting a scleral contact lens 15 over the cornea 13, the lens 15 having an inner surface 16 in contact or partial contact with the cornea 13 and an outer surface 17 in contact with the palpebral conjunctiva 12.

Figure 2:
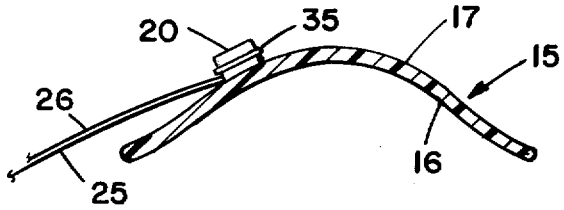
FIG. 2 is a view in side elevation of a scleral contact lens incorporating an oxygen-sensing electrode in accordance with the invention.
Figure 3:
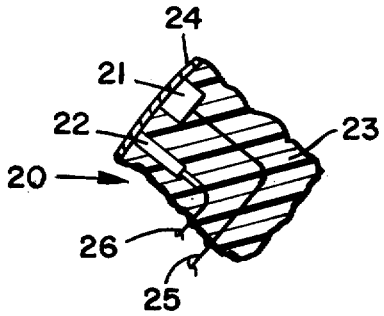
FIG. 3 is a fragmentary view in section of a portion of the assembly of FIG. 2.

As shown in FIGS. 2 and 3 this contact lens 15 is provided with at least one sensor 20, which may comprise a Clark polarographic oxygen electrode sensor, having a silver anode 21 and a small platinum cathode 22 embedded in plastic 23 and covered by a thin film or membrane 24 of material such as 12$\mu$ polyethylene. The sensor 20 may be secured to the outer surface 17.

Figure 4:
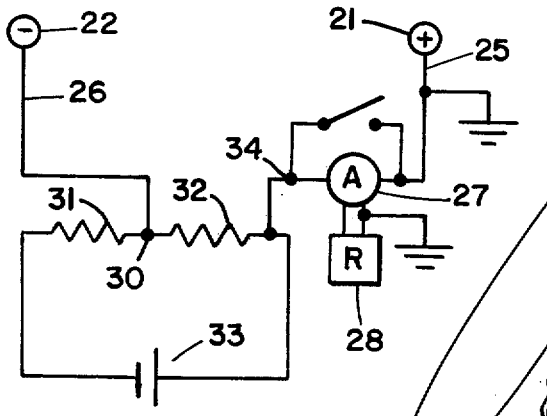
FIG. 4 is a circuit diagram for a gas electrode circuit.

The sensor 20 has leads 25 and 26. As shown in FIG. 4, the lead 25 from the anode 21 may be grounded and pass to a suitable microammeter 27 and to a recorder 28. The lead 26 from the cathode 22 may go to a voltage divider 30 comprising two resistors 31 and 32, and a power source 33, such as a 1.35 volt cell may be converted to opposite ends of the voltage divider 30, which is connected by a lead 34 to the ammeter 27. Other types of circuits may be used.

Continuous measurements of palpebral conjunctival oxygen tensions have been obtained by such a membrane-covered (polyethylene, 12$\mu$) polarographic electrode 20 with a platinum cathode 22 that was 25$\mu$ in diameter mounted eccentrically on a scleral contact lens 15. The site of attachment was chosen so that the electrode 20 would abut directly on the tarsal portion of the palpebral conjunctiva 12, where the epithelial tissue is firmly stretched over a supporting structure of dense connective tissue and where the epithelium would normally be in contact with the cornea 13 when the eye 10 is closed. One particular electrode or sensor 20 in the finished state produced a small protuberance (2.0 to 2.5 mm at the most) of the lid 11 above the normal curvature of the eye 10 covered by the scleral contact lens 15.

The electronic circuitry for the conjunctival electrode may comprise primarily a Hewlett-Packard microammeter 27 and a Heathkit [sevo-recorder] *servo-recorder* 28. Between the cathode 22 and the silver anode 21, a potential of 0.75 volts was applied by the cell 33. In this system currents of 2 to 3 nanoamps were recorded for 150 torr oxygen. To check correlation, arterial oxygen tension measurements were also done on blood samples taken from the femoral artery and passed over a standard Clark polarographic oxygen sensor in a constant-temperature cuvette. A Beckman Model 160 gas analyzer was used for readout. Blood pressure was monitored via a catheter in the femoral artery and a Model P2-1251 Wiancko pressure transducer.

The contact-lens electrode 20 was calibrated at 35°-36° C. The temperature under the eyelid 11, measured by a small polyethylene thermistor probe, remained in the range of 37.0° to 36.4° C. during a four-hour experiment. The arterial electrode was calibrated and maintained at 39° C. Water-saturated pure nitrogen and water-saturated air were used as standards.

In animal tests, eight adult New Zealand White rabbits were anesthetized with 40 to 50 mg/kg of sodium pentobarbital of 2.0 g/kg of urethane in divided doses so that the corneal reflexes were lost. Tracheostomies were performed, and the rabbits allowed to respire at their own rates and depths. A polyethylene cannula was placed in a femoral artery and threaded into the distal aorta to take arterial samples and monitor blood pressure.

The scleral contact-lens 15 with the oxygen electrode 20 was then positioned in the eye of the rabbit and the lid sutured shut. Sutures were used for these tests because tape would not stick to the hairy rabbit eyelids; in one rabbit, however, tape was sufficient to hold the electrode in place. The palpebral conjunctival oxygen tensions were recorded continuously with the rabbits inspiring various mixtures of oxygen, prepared by mixing 100 per cent oxygen and 100 per cent nitrogen through two flowmeters, two feet of tubing and a rebreathing bag. In some experiments, at each inspired oxygen tension an arterial blood sample was taken and its oxygen tension measured after the conjunctival oxygen tension had become stable. Recalibration at the termination of the experiment showed that the contact-lens electrode 20 was stable after five hours.

Figure 5:
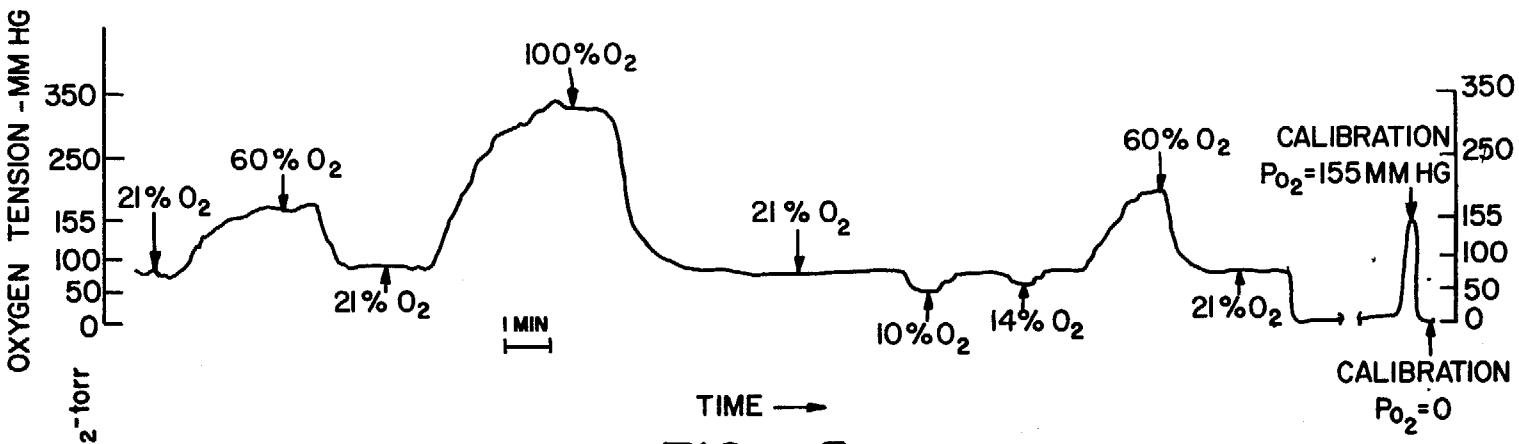
FIG. 5 is a tracing of palpebral conjunctival oxygen tension over a period of time, with various changes in oxygen ratio in the gas being breathed.

As shown graphically in FIG. 5, within one-half to two minutes after changing the composition of the inspired oxygen mixture, a maximal and steady-state tissue oxygen tension was found. Stable repeatable tissue oxygen tensions varying from 35 to 520 torr were obtained continuously over a three to five-hour period in each of eight experiments for a range 10 to 100 per cent inspired oxygen. No variation in electrode current was caused by the mechanical pressures generated by the eyelids over the electrode face. Movement of the contact-lens electrode under the lid for distances of 5 to 6 mm resulted in transient changes in current, but the oxygen tension recorded returned to the preceding stable reading once the movement stopped. Thus, the time delay between breathing and palpebral conjuctival oxygen tension is quite brief, and the delay with respect to arterial oxygen is even shorter.

When the rabbits were breathing room air, palpebral conjuctival oxygen tensions of 50 to 100 torr were obtained. On the basis of oxygen-hemoglobin dissociation data in the rabbit, the expected arterial oxygen tension would be 75 to 80 torr at 95 percent saturation. The experimental results for both tissue and arterial oxygen tensions (see FIG. 6) are in good agreement with this expectation for respiration of room air. Mean conjuctival-tissue $PO_2$ was 70 $\pm$ 13.3 torr, and mean arterial $PO_2$ 93 $\pm$ 13.4 torr when room air was inspired. Charleton, Read, and Read (in Journal of Applied Physiology, Volume 18, No. 6, pages 1247-1251, 1963) reported that intraarterial oxygen tensions measured by a microelectrode in man varied from 70 to 127 torr (mean 84 torr) during respiration of air at rest; with voluntary hyperventilation of 712 torr oxygen, arterial oxygen tensions varied from 610 to 656 torr (mean 637 torr).

Figure 6:
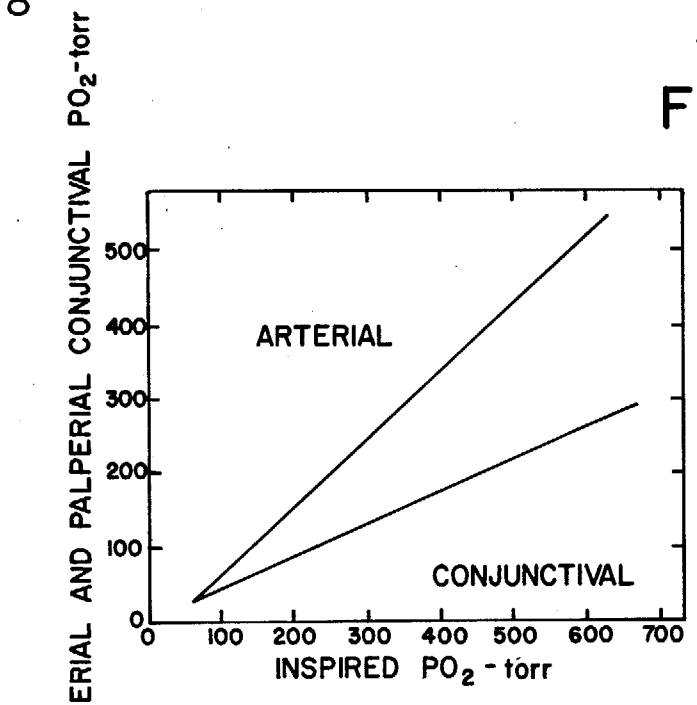
FIG. 6 is a graph showing a typical relationship between palpebral conjunctival oxygen tension and arterial oxygen tension, plotting oxygen tension in torrs against inspired oxygen tension in torrs.

The steady-state palpebral conjuctival oxygen tensions recorded and the arterial oxygen tensions are shown in FIG. 6 as functions of a wide range of inspired oxygen tensions.

One mounted membrane-covered electrode 20 protruded 2.0–2.5 mm vertically from the carrier lens 15 and with an O-ring 35 in place produced a 6–7 mm circular, horizontal protuberance. Fine insulated wire leads 26 and 25 connect the electrode 20 to the battery box which provides the polarizing voltage. The polyethylene-covered cathode 22 and anode 21 thus are insulated from the body and should not add to the microcurrents involved in EKG monitoring or the macrocurrents from electrocautery. The battery box is connected to the microammeter 27 and recorder 28 which may rest on a cart or other support close to the subject's head. These instruments 27 and 28 are suitably calibrated, as described below. A calibrating setup including a constant temperature bath, and small tanks of gas may also be included in this space.

Operator skills required are essentially the same as those required for anyone making arterial blood gas measurements.

Human trials have employed an electrode 20 mounted on a corneal contact lens 15. In normovolemic, normotensive, anesthetized patients, the same type of correlation exists between palpebral conjunctival $PO_2$ and arterial $PO_2$ as in the rabbit. Standard deviations are even smaller, perhaps because of the much better control of perfusion, ventilation and anesthesia.

The estimating equation (arterial $PO_2 = 34.4+0.91 \times$ inspired $PO_2$) for arterial $PO_2$ as a function of inspired $PO_2$ is represented by the upper solid line in FIG. 6 and has a correlation coefficient, r, of 0.98. One standard deviation of the [estimated arterial $Po_2$,] *estimated arterial $PO_2$* for the entire line is 30 torr. The lower solid line in FIG. 6 represents the estimating equation (tissue $PO_2 = 17.8 + 0.40 \times$ inspired $PO_2$) for tissue $PO_2$ as a function of inspired $PO_2$, r is 0.67, and one standard deviation for the entire line is 68 torr. The two lines in FIG. 6 show that the palpebral conjunctival oxygen tension as measured in this system can give an approximation of the arterial oxygen tension.

Figure 7:
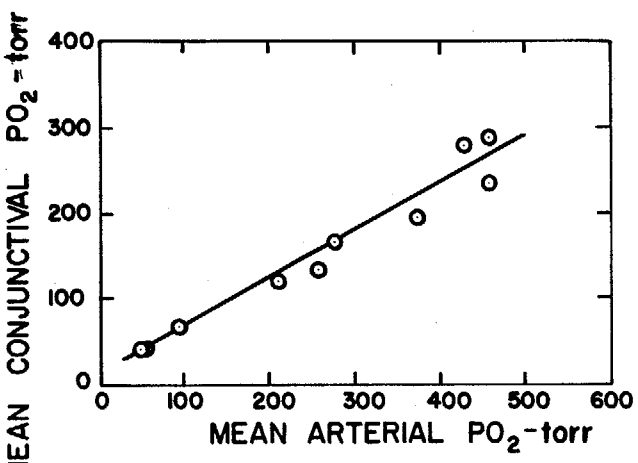
FIG. 7 is a graph of mean arterial oxygen tension versus mean palpebral conjunctival oxygen tension at a series of inspired oxygen tensions.

The relationship between [palpegral] *palpebral* conjunctival and arterial [oxyten] *oxygen* tensions for any given inspired oxygen tension is given by the equation: arterial $PO_2 = 2.3 \times$ palpebral conjunctival $PO_2 - 75$ torr. Arterial $PO_2$ can be estimated from a measured tissue $PO_2$ graphically, if desired. For any inspired $PO_2$ a correction factor can be added to the measured palpebral conjunctival tissue $PO_2$ to give an estimate of arterial $PO_2$. FIG. 7 is a graph of the mean arterial $PO_2$ versus the mean conjunctival $PO_2$ at each inspired oxygen tension, and again reflects the linear correlation between the two. Part of the deviation from a theoretical 1:1 correlation indicates the extent of oxygen consumption by the tissue between sensor and the capillaries; the rest is probably due to relative decreases in local blood flow at higher oxygen tensions.

The ammeter 27 and recorder 28 are preferably calibrated to read arterial $PO_2$ directly by an appropriate readout scale to provide the multiplier constant of the above equation, while the location of the zero point provides the subtraction constant. This calibration thereby multiplies the detected tension by the indicated constant while also subtracting a second constant. The spread of the calibration points thus accomplishes multiplication, and the location of zero therein effects subtraction — in just the same manner as any ammeter (e.g., a galvanometer) may be calibrated to read in terms of amperes, milliamperes, or microamperes and may be calibrated to read in terms of current above any predetermined level. Here the ammeter 27 and recorder 28 may be calibrated either in terms of palpebral oxygen tension or in terms of arterial oxygen tension.

This system is apparently capable of monitoring hypoxic and hyperoxic states, and gives an estimate of arterial oxygen tension in normotensive, normovolemic animals. The conjunctival electrode, which is not limited by the 100 percent saturation of hemoglobin, can be very useful as a means of detecting hyperoxia in premature infant nurseries and acute pulmonary [case centers.] *care centers.* The monitoring system of this invention may show a characteristic dependence of tissue oxygen tension on local blood flow, which could make the palpebral conjunctival electrode useful as a signal of impending shock. This technique has the additional advantage of being non-invasive and relatively atraumatic. No gross corneal damage was noted in the rabbits, and scleral contact lenses have been in human use for years.

Because of the rapid response (minutes), the stability (hours), and the steady-state nature at a given oxygen tension, this conjunctival monitoring system is well suited to use as an aid in the continuous monitoring of the levels of oxygenation of patients during anesthesia and intensive respiratory care. The palpebral conjunctiva is supplied by the internal carotid artery via branches of the ophthalmic artery, and thus may be preferentially perfused over other cutaneous areas during minimal hypovolemia. Preliminary studies show that for animals in shock the palpebral conjunctival oxygen tension has a more complex relationship to the arterial oxygen tension. Once the exact relationship is better understood, this monitoring device will have further clinical use.

Thus, this invention is adapted to human use as a non-invasive, continuous method for monitoring arterial oxygen tensions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for non-invasively determining continuous arterial oxygen tension of a patient, comprising the steps of a. non-invasively measuring the palpebral conjunctival oxygen tension, b. multiplying said tension by a constant dependent upon the relationship between the oxygen tension of the palpebral conjunctiva and the arterial oxygen tension of the patient, and c. subtracting a second constant also dependent upon said relationship.

2. The method of claim 1 wherein said measuring, multiplying and subtracting are carried out substantially simultaneously and continuously.

3. A method for non-invasively and continuously determining continuous arterial oxygen tension of a patient, comprising the steps of a. continuously non-invasively measuring the palpebral conjunctival oxygen to provide readings thereof; and b. continuously converting the readings to values in terms of the relation of palpebral conjunctival readings to arterial conditions.

4. The method of claim 3 wherein the measurements are continuously recorded.

5. A method for non-invasively determining continuous arterial oxygen tension of a patient, comprising the steps of 1. securing an oxygen-sensing electrode assembly to the outer surface of a scleral contact lens member,
2. emplacing said contact lens member between the cornea of the patient's eye and the palpebral conjunctiva of his eyelid,
3. applying voltage to said electrode assembly,
4. reading the current passed, and
5. calibrating said current in terms of the oxygen tension modified by factors corresponding to the relation between the slope and origin of the arterial oxygen tension to palpebral conjunctival oxygen tension.

6. The method of claim 5 wherein steps (3) and (4) are done continuously.

7. The method of claim 6 wherein the calibrated reading is continuously recorded.

8. Apparatus for non-invasively determining arterial oxygen tension of a patient, comprising a. means to abut the surface of palpebral conjunctiva for detecting the oxygen tension thereof, b. means for reading the value of the detected tension while multiplying this value by a constant dependent upon the type of patient and upon the relationship between oxygen tension of the palpebral conjunctiva and the arterial tension of the type of patient while subtracting a second constant also dependent on said relationship.

9. The apparatus of claim 8 wherein said means (a) comprise a membrane polarographic oxygen sensor.

10. Apparatus for non-invasively determining continuous arterial oxygen tension of a patient, comprising a. means to abut the surface of palpebral conjunctiva for continuously detecting the oxygen tension thereof, b. means for continuously indicating the value of the detected tension while multiplying this value by a first constant dependent upon the relationship between the oxygen tension of the palpebral conjunctiva and the arterial oxygen tension of the patient, and while continuously subtracting therefrom a second constant also dependent on said relationship, and c. means for continuously displaying the results of (b).

11. Apparatus for non-invasively determining continuous arterial oxygen tension of a patient, comprising 1. a scleral contact lens member having an oxygen-sensing electrode assembly secured to said lens member and sensing at the outer surface thereof, so that said contact lens member can be placed between the cornea of the patient's eye and his eyelid,
2. means for applying voltage to said electrode,
3. means for reading the current passed, and
4. means calibrating said reading in terms of the oxygen tension as modified by factors corresponding to the relation between the slope and origin of the arterial oxygen tension to palpebral conjunctival oxygen tension.

12. The apparatus of claim 11 wherein said gas-sensing electrode assembly is a membrane polarographic electrode assembly.

*13. Apparatus for non-invasively indicating continuous arterial oxygen tension of a patient, comprising*

*1. a scleral contact lens member having an oxygen-sensing electrode assembly secured to said lens member and sensing at the outer surface thereof, so that said contact lens member can be placed between the cornea of the patient's eye and his eyelid,*

*2. means for applying voltage to said electrode,*

*3. means for sensing the current passed, and*

*4. means indicating said sensed current in relation to the oxygen tension as modified by factors corresponding to the relation between the slope and origin of the arterial oxygen tension to palpebral conjunctival oxygen tension.*

*14. A method for non-invasively indicating continuous arterial oxygen tension of a patient, comprising the steps of*

*1. securing an oxygen-sensing electrode assembly to the outer surface of a scleral contact lens member,*

*2. emplacing said contact lens member between the cornea of the patient's eye and the palpebral conjunctiva of his eyelid,*

*3. applying voltage to said electrode assembly,*

*4. sensing the current passed, and*

*5. indicating said sensed current in terms of the oxygen tension modified by factors corresponding to the relation between the slope and origin of the arterial oxygen tension to palpebral conjunctival oxygen tension.*

* * * * *